INVENTOR.
Louis S. Kahn
BY B. Gordon Allen

United States Patent Office 3,067,780
Patented Dec. 11, 1962

3,067,780
METHOD AND MACHINE FOR CUTTING SPRINGS TO LENGTH AND FOR FORMING END LOOPS THEREON
Louis S. Kahn, Deerfield, Ill., assignor of one-third to Joseph E. Goldberg, Chicago, Ill., and one-third to Mark L. Goldberg, Glencoe, Ill.
Filed Aug. 19, 1959, Ser. No. 834,684
9 Claims. (Cl. 140—103)

This invention relates to spring manufacturing. In particular it has reference to an automatic machine for cutting sections of coil spring material to form a blank of accurate length and for fabricating loops at the ends thereof.

Heretofore it has been the practice to form a continuous length of coil spring stock on a coiling machine, cut the same to some specified, more or less average or rough length and then to form the end loops manually. By this procedure it has been difficult to obtain a precise length of the cut material and the accurate formation of the end loops to specified standards. As a consequence the spring constant varied from spring to spring.

The present invention has for its principal object the provision of an automatic machine adapted to receive even crudely cut pieces of spring stock, having a length slightly greater than the desired blank, to trim the excess to obtain a specified cut length and, in the one machine, form end loops of various, common configurations.

Additional objects are to provide a machine in accordance with the foregoing which will accept feed from a hopper and delivery chute, will operate at a high production rate, possesses accurate reproducibility, is expeditiously adjusted and tooled for varying designs and lengths of springs, is simple in construction and inexpensive to maintain.

Other objects and advantages will become apparent from the ensuing description which, taken with the accompanying drawings, discloses a preferred embodiment of the invention.

In these drawings:

FIGS. 1A and 1B comprise a cross sectional view of a machine in accordance with the invention, as seen from the rear and taken in a plane which, for purposes of this specification, may be regarded as through the longitudinal axis; this view, because of space limitations, having been sectionalized and keyed by the broken line I—I;

Regarded broadly the invention contemplates an automatic machine, e.g. for the fabrication of extension springs, to which is delivered, by chute or otherwise, properly oriented, relatively rough-cut blank sections of spring, these blanks being of a length slightly greater than the ultimate length to which the blanks will be sheared in the machine to some exact, predetermined length. The rough-cut blanks are deposited singly and successively between the then open jaws of individual vises carried on the periphery of an intermittently rotated work carrier operatively associated with cam means whereby the vise is thereafter automatically closed, and the blanks are presented first, to a cutting-off station, second, to a loop forming station and third, following automatic opening of the jaws, the finished springs are delivered to a discharge chute or bin.

At the cut-off station a pair of oppositely disposed heads are arranged to reciprocate in the direction of the axis of the blank. Each head carries respective coaxial mandrels, respectively receiving the ends of the blank upon advance of the respective heads towards the blank whereupon the rough cut ends are cut to an accurate, predetermined length by automatically operating respective shearing blades cooperative with a companion shearing surface formed in the distal end of the mandrels. The mandrels also serve as the female half of the cutting-off tool set. In connection with this aspect of the invention novel means are provided for dislodging the trimmed scrap from the mandrel.

Following cut-off the carrier is indexed to bring the accurately cut blank to a loop forming station whereat a symmetrical pair of heads are caused to reciprocate into working relation with the blank, whereupon two sets of loop-forming tools come into play to form the end loops, there being one set individual to each end of the work piece. These heads are so constructed as to receive various sets of tools interchangeably for forming any of several commonly specified loops, for example, machine loop, machine hook, small eye, so-called hand loop, full loop, double loop, any of which may be centered or at the side, in line with each other or at an angle. Inasmuch as the differences in these named examples and others, within the scope of the invention machine, involve only a matter of design of the appropriate tools, the various types of loops will not be elaborated upon. The loop-forming heads are arranged to be independently oriented angularly about the axis of the balnk whereby the planes of the end loops may be differently angularly disposed relative to one another. Similarly with respect to the cut-off heads whereby a blank may be so trimmed as to result in an open loop having a defined gap.

Subsequent to the loop-forming operation the carrier is indexed again whereupon the vise jaws are automatically opened to release the finished spring to a discharge chute or bin.

Certain important features of the invention reside in the construction of the vises. In one respect the mechanism for operating the vises between open and closed positions includes resilient means whereby closing action of the vises is of a cushioned character rather than one which is positive. Accordingly the work piece is not cushioned by the clamping action of the vise jaws. It will be understood that such resilient pressure may be proportioned to the transverse resistance of the work piece simply by adjusting the bias. Accordingly springs wound of extremely fine wire may be processed in the machine with complete safety.

In another respect the vises are maintained in alignment by inter-engaging bores and dowels, and the dowels are so positioned with respect to the recesses in the jaws that when a blank is delivered thereinto it will first rest on the dowels in a position whereat the jaws may close thereon without danger of deforming the blank, as might otherwise be the case if the blanks were dropped indiscriminately between the jaws.

The invention machine is characterized by an extremely rapid rate of production as compared to the present manual rate.

In one of its aspects the invention incorporates a novel bearing for the rotating and reciprocating heads of a character which facilitates proper lubrication while dispensing with elaborate oil-sealing shrouds and gaskets, and which is readily convertible for presentation of an unused set of reciprocable bearing surfaces upon wear of one set.

Figure 1A:
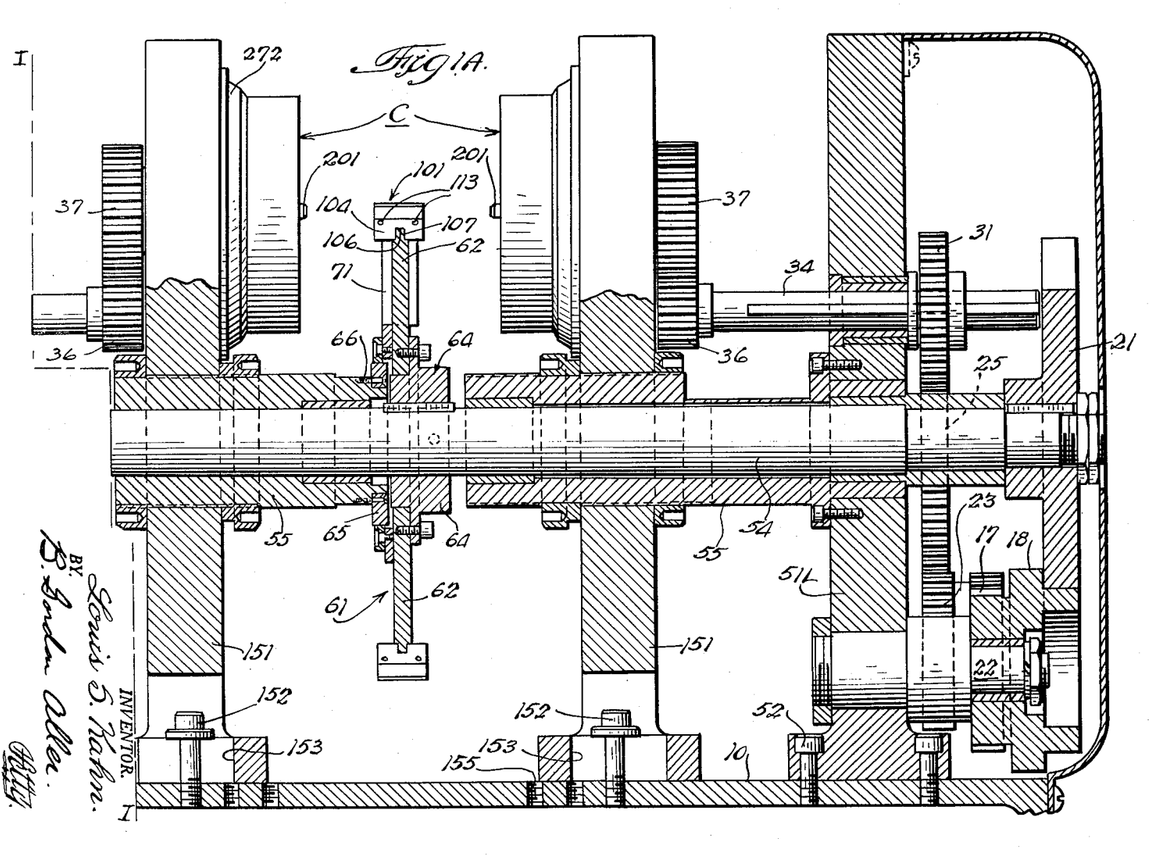

Adverting to the drawings I have illustrated (FIGS. 1A and 1B) a machine comprising a rigid base 10. A driving motor (not shown) drives (FIG. 9) through a belt 12, a sheave 13 integral with a gear 14 and rotatable on a stud 15. Gear 14 is in mesh with a gear 17 integral with the driving member 18 of a Geneva movement, of which the driven member 21 is the companion part, a stud shaft 22 providing support. The gear 17 drives an idler gear 23 carried on a stud shaft 24. Gear 23, in turn, drives a gear 25. This latter is keyed to a shaft 26 with a pinion 27 which, in turn, drives a gear 28 keyed to a shaft 29 driving the right hand loop forming station (as seen in FIG. 1A). Gear 25 drives a gear 31 on shaft 32, and thence a gear 33. Gear 33 is on a shaft 34 with a pinion 36 in mesh with a gear 37 for driving of the cutting-off station. Gear 37 is carried on a splined shaft 38.

It will be understood that shaft 15 is carried from the right-hand end of the machine (FIG. 1A) through to the left-hand end where, by essential duplication of the gear train just described, the movement is imparted to the other half, i.e. left-hand components, of the cutting-off and looping stations respectively.

The several shafts 15, 22, 24, 26, 29, 32 and 38 are journalled in or retained endwise in a pair of standards 51R and 51L secured, by screws 52, to the base 10.

The star wheel, i.e. driven member 21 of the Geneva movement is keyed at the right-hand end of a shaft 54 rotatable in bearings 55 mounted in the standards 51R and 51L, whereby intermittent rotation is imparted to the work carrier now to be described.

The work carrier 61 (FIGS. 1A and 10) comprises a spider 62 having a hub 64 keyed to the shaft 54. A non-rotatable ring cam 65 having a rise 60 is secured to the bearing sleeve 55 by screws 66, and cooperates with a plurality (in this case, six) of follower rollers 68 carried on studs 69 mounted on levers 71. Each lever 71 rocks on a shoulder screw 72 threaded into the spider 62. Thus, upon rotation of the shaft 54, as pulsed by the Geneva movement, the several levers 71 are rocked in succession as their respective followers 68 are actuated by the rise 60 of the static cam 65.

Figure 9:
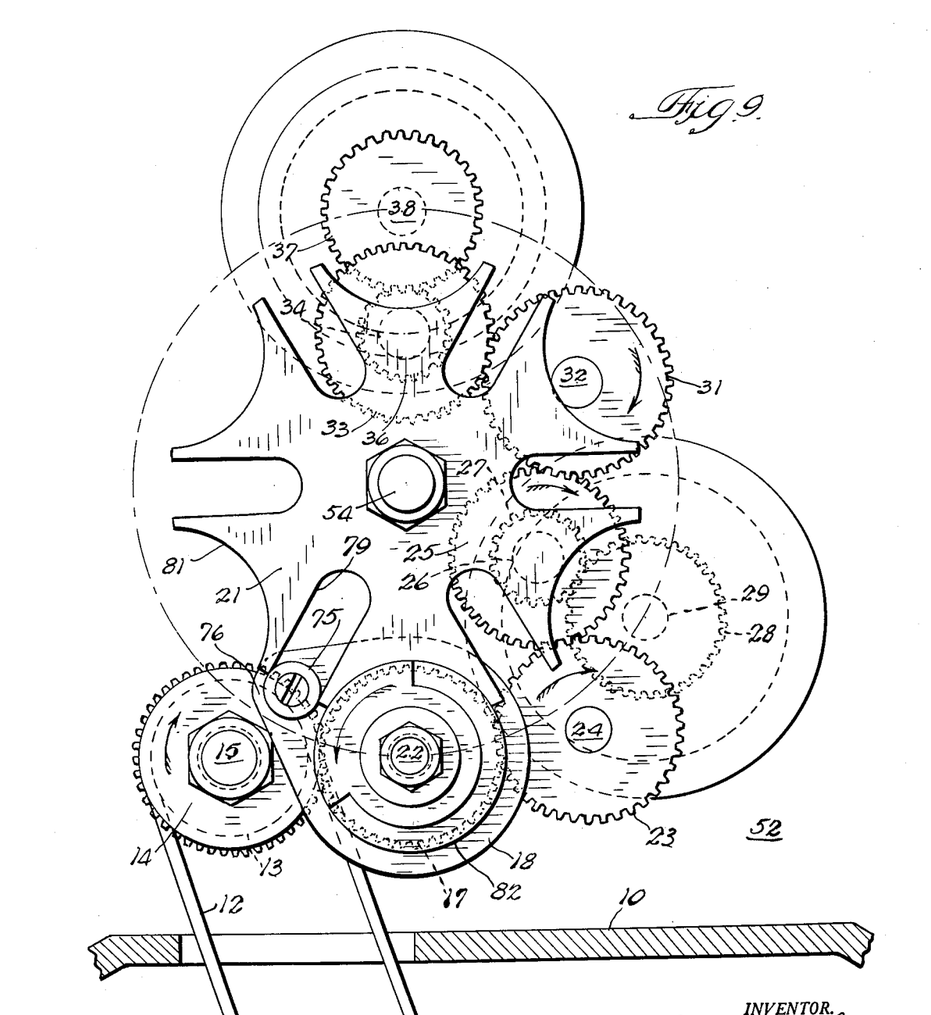
FIG. 9 is an end elevation of the intermittent driving mechanism for indexing the work carrier.

As stated, the Geneva movement comprises driving member 18 and star wheel 21. Member 18 rotates continuously whereby a roller 75 carried on a radial arm 76 thereof enters and leaves each of the radial slots 79 of the star wheel 21 to impart intermittent rotation thereto. Dwell periods of the star wheel occur by reason of the arcuate sections 81 thereof osculating successively with the congruent section 82 of the driving member 18.

The blank work pieces, i.e. sections of coil spring of some approximate length, are delivered by any well known means to a loading station indicated at L (FIG. 10), which will be described in detail subsequently. The arrow at L is normal to the direction of rotation and indicates the direction of feed of the blanks.

Figure 10:
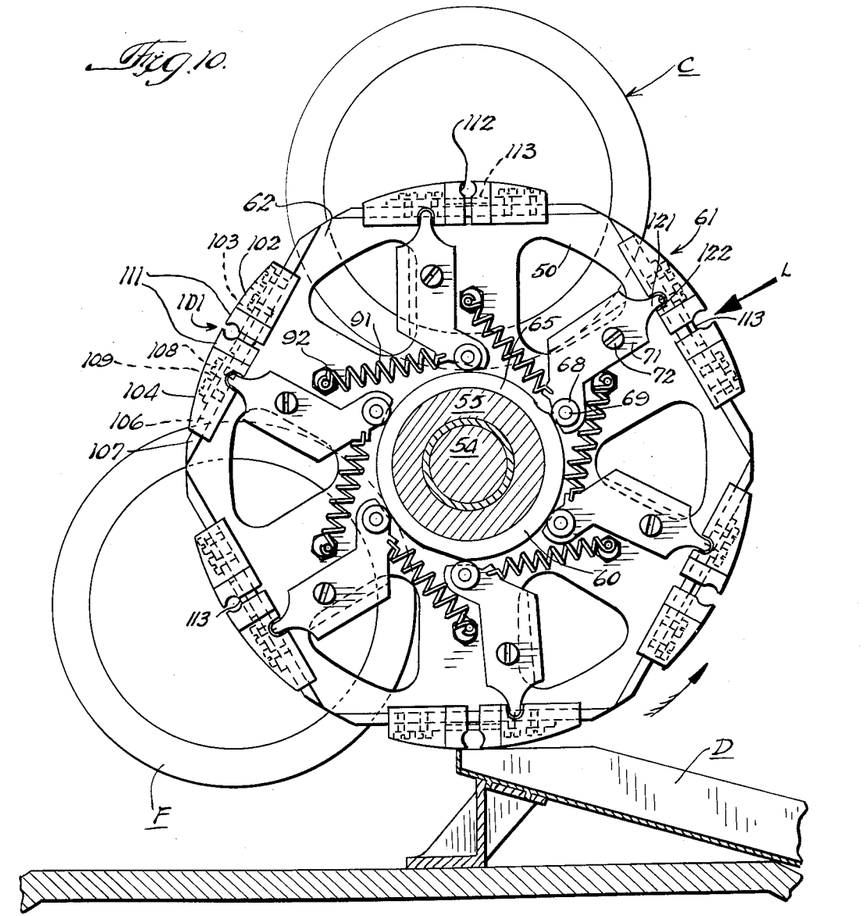
FIG. 10 is a side elevation of the work carrier.

Referring to FIGS. 1A and 10, a plurality of pairs of jaws, i.e. vises, 101, in this case, six, are carried on the periphery of the disc 62. One of the jaws, 102, is fixed to the carrier, as by screws 103, and the other, 104, is movable by sliding engagement of a channel 106 therein upon a mating rib 107. Screws 108 passing through slotted holes 109 in the jaw 104 act to retain the same in its operative positions and to limit the stroke thereof. Both the movable and fixed jaws have detachably secured face portions 111 of various interchangeable working dimensions. That is to say, for each diameter and length of work piece, within the range for which the machine is designed, the substantially semi-cylindrical recesses 112 in the jaws and the length of the jaws will vary, with due consideration being given to the overhang of the blank at each end necessary to allow operations thereon. These face portions 111 may be of any suitable material which will grip the work piece without injury and may be secured in any manner which will facilitate interchangeability. Moreover a pair of pins 113, fastened in one of the jaws and freely slidable in holes in the other thereof will assist in maintaining alignment thereof, and are arranged in such radial position as to assure that the blank being loaded will come to rest substantially in proper position between the recesses 112 prior to closing of the jaws.

Each lever 71 has its central portion of U-shaped, transverse cross section to provide a leg on both faces of the spider 62, the apertures 50 in the spider 62 providing clearance. Each leg terminates at its outer distal end in a finger 121 each of which is engaged in a notch 122 in the movable jaw 104 whereby, as the lever is rocked by the cam 65, the jaw is opened and closed. It will be noted that the cam rise 60 is of such angular extent and orientation as to result in the jaws being opened prior to arrival thereof at the loading station L and to close just before that set of jaws arrives at the cut-off station, the jaws remaining closed until the same arrive at the discharge station whereat they are opened preparatory to reception of a succeeding blank. Rotation is counter-clockwise as seen in FIG. 10.

Figures 11, 12, 13:
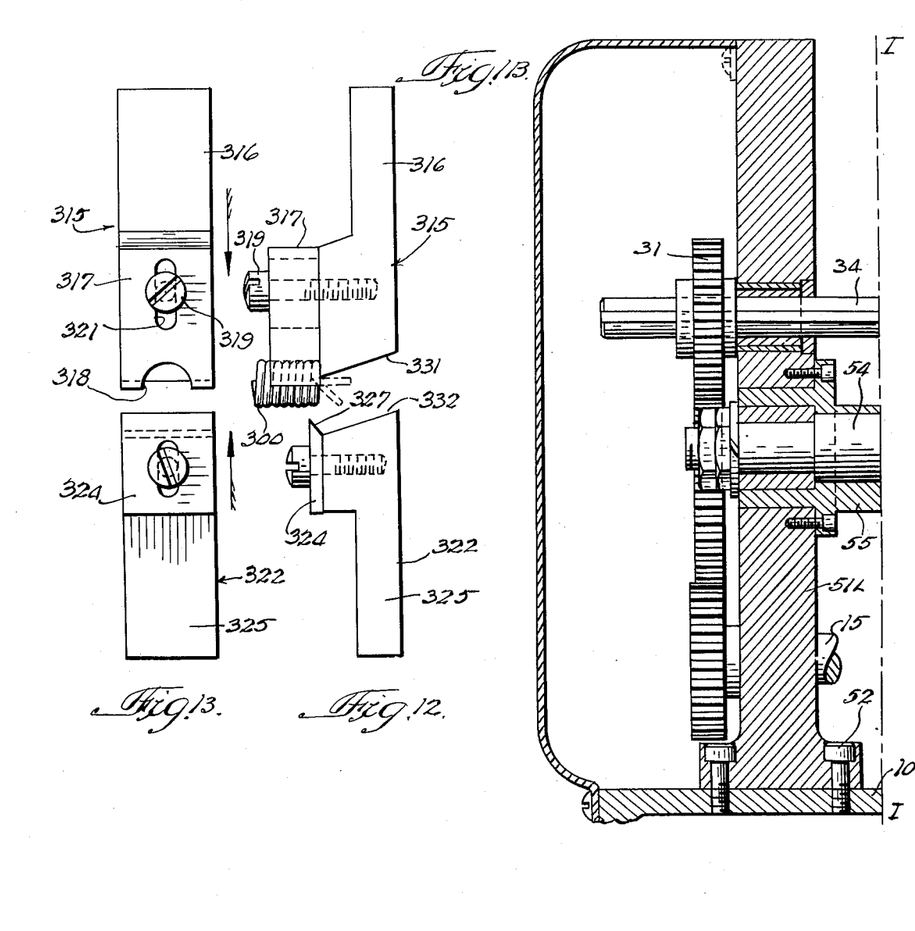
FIG. 11 is a perspective detail of the adjustable post for the springs of FIG. 10.
FIG. 12 is a front elevation of a typical set of tools for forming loops on the blank.
FIG. 13 is a side elevation of the set of tools shown in FIG. 12.
Figure 11:
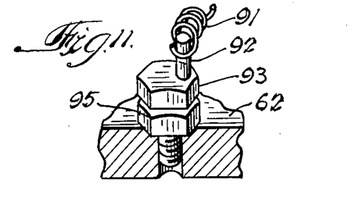

Inasmuch as springs to be processed by the machine may be wound of fine gage wire it is essential that the same be held with just sufficient force to carry the same through the cutting-off and loop-forming operations and yet not be crushed. To obtain the required resilient, jaw-closing force each lever 71 is provided with an extension spring 91 secured at one end to the lever and at the other end to a spring post 92 (FIG. 11). The post is carried eccentrically on the head of a screw 93 threadedly engaged in the spider 62. Thus the tension in the spring 91 may be very accurately regulated by rotation of the screw whereafter the lock nut 95 preserves the adjustment.

Following loading of each blank in an individual vise 101 the same is moved successively to a cut-off station C and a loop-forming station F, the position of each of which is generally indicated in FIG. 10 and which will now be described in detail.

A pair of standards 151 are secured to the base 10 by screws 152 passing through elongated holes 153 whereby the same may be adjusted in a longitudinal sense to the limit of the holes in order that various lengths of springs may be accommodated by the machine. Additional such adjustment is afforded by several tapped holes, such as 155, wherein the screws 152 may be received interchangeably.

In connection with the description of the cut-off and loop-forming heads to follow it will be understood that the same occur in opposed members of a pair, to serve both ends of the blank simultaneously. The driven shafts 34 (FIG. 2) are rotatably received in bearings in the standards 51R and 51L and are restrained longitudinally with respect to the respective standards 151 by washers 156 and screws 157 whereby longitudinal adjustment of the standards 151 carry the shafts 34 therewith. A spline 161 receives a key held by a set screw 162 in the hub of the gears 33 to preserve driving engagement of these gears and their respective shafts notwithstanding adjustment of the respective standards 151.

Shafts 34, provided with the respective keyed pinions 36, drives the respective gears 37 secured to shafts 38 rotatably supported in the standards 151 for rotation of an associated cam 167 having a cam channel 168. Each cam 167 is retained axially in a recess 171 by means of an outer head section 172 secured by screws 173 but is free to rotate therein. As will appear the head reciprocates as the cam rotates requiring a drive for the cam combining rotary and reciprocating motion. Such drive is imparted to the cam 167 from the stub shaft 38 by a novel form of coupling now to be detailed.

The cam 167 is rendered integral with a hub 175 which may undergo reciprocating motion relative to the shaft 38 upon an anti-friction bearing. This latter (FIGS. 6 and 14) comprises a cage 177 having a plurality of peripherally staggered apertures each receiving an individual ball bearing 179. Inasmuch as the cage 177 and its therein-retained balls is a standard article of commerce further detailed exposition thereof may be dispensed with. One end of the shaft 38 carries a diametrical stud 181 secured thereto by a screw 182 and has a roller 184 at each end thereof. The rollers 184 are aligned transversely of the axis of the shaft 38 to bear on one side of a pair of diametrically opposed slots 186 in the hub 175, as shown. The width of these slots is greater than the diameter of the rollers 184. The axis of the stud 181 is offset from the axis of the shaft by an amount which is one-half the difference between the width of the slots 186 and the diameter of the rollers 184 except for some minute allowance to provide a "jam" fit between the rollers and slots.

Inasmuch as the hub 175 reciprocates with respect to the shaft 38 and is driven thereby, the coupling means just described has been found to be ideally suited to that function and is easily maintained in a fully lubricated condition as compared to a conventional splined joint. Moreover when the slots 186 wear to a point where objectionable backlash occurs, the parts may be rapidly disassembled, the hub removed from the cam and rotated 180°, so that the opposite, unworn wall of the slots is presented to the rollers. As is clear from FIG. 6 this is made possible by the off-center relation between the axes of the stud 181 and shaft 38.

Figures 2, 3, 4, 5, 6:
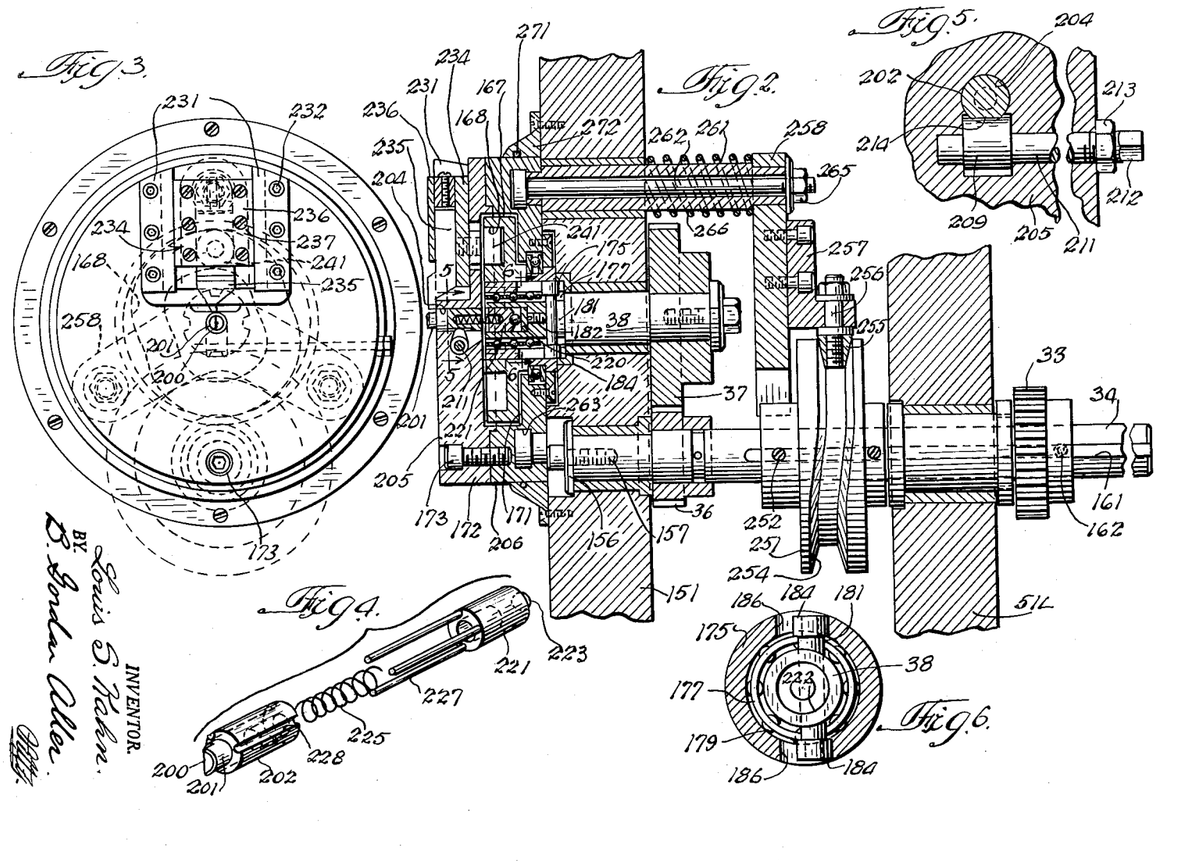
FIG. 2 is a longitudinal cross section through one of the cutting-off stations, its opposite counterpart being substantially symmetrical therewith.
FIG. 3 is an end elevational view of the cutting-off station shown in FIG. 2.
FIG. 4 is an exploded, enlarged, perspective view of the stripper for the scrap.
FIG. 5 is a cross-sectional detail taken on the line 5—5 of FIG. 2 to show the means for locking the mandrel for supporting the blank during trimming.
FIG. 6 is a cross-sectional detail taken on the line 6—6 of FIG. 2, to illustrate a novel form of drive connection for the cut-off and loop-forming heads.

After the blank lengths of spring are fed to the individual vises 101 and gripped therein by closing of the jaws they are rotated to the cut-off station C and the carrier rests. Immediately the two heads of the cut-off mechanism (only one of which is shown in FIG. 2) are caused to approach the blank in an axial direction whereupon a mandrel 201 on each head enters the ends of the blank to support the same during trimming. The mandrels 201 are hardened and of a diameter freely fitting within the blank, and are cut away at the ends, e.g. on a diametrical plane, to provide a shearing face 200 for co-operation with the movable shearing blade to be described.

The mandrel 201 will assume various diameters depending upon the work piece. Accordingly the same is desirably formed as an extension of a shank 202 received in a bore 204 in the outer head section 172 which is attached to an inner head section 206. To facilitate interchange of one pair of mandrels for another the same are locked in the aperture 204 by a cam 209 (FIG. 5) fixed to a shaft 211 having a polygonal termination 212 to receive a wrench for rotation of the cam between locking and unlocking positions. A locknut 213 is provided. The shank 202 is provided with a flat face 214 for abutment by the cam 209 to supplement locking thereof and to orient the shearing face 200 in cooperative relation with the companion blade.

Inasmuch as shearing of the ends of the blanks leaves the scrap material held or seized on the mandrels I provide stripping means best seen in FIG. 4. A cylindrical member 221 is received freely in a bore 222 in the adjacent end of the shaft 38 with a fit permitting the shaft to revolve therearound and is provided with a ball 223 bearing on a hardened disk 220 at the bottom of the bore to minimize friction due to end thrust. The member 221 and shank 202 are axially bored to receive a compression spring 225 which serves to maintain the member 221 in its bore 222 as the head 206 is reciprocated. Member 221 carries a plurality of axially-extending pins 227 slidable in longitudinal grooves 228 in the peripheral surface of the shank 202. When the head 206 is in extended position, i.e. spring-engaging position, the pins 227 are within the shank 202 and when the head is retracted the pins 227 are brought beyond the shank 202 against the scrap whereby to dislodge the same from the associated mandrel 201. The scrap is allowed to drop into a conveniently located receptacle on the base 10 or through an opening therein.

The outer head section 172 is provided with a pair of gibs 231 secured thereto by screws 232 to define a slideway within which a crosshead 234 is adapted to slide. The movable shearing blade 235 is clamped on the crosshead by a plate 236 and screws 237. It will be seen from FIGS. 2 and 3 that the working edge of the tool 235 cooperates with the working edge 209 of the mandrel 201 to shear the excess turns from the ends of the blank. Moreover, it will be understood that the stroke of the two cutting-off heads, namely, their maximum approach to each other, is adjustable to effect shearing of the blank to the predetermined length, and as will appear subsequently. The crosshead 234 is reciprocated in synchronism with reception of the blank on the mandrels by means of a follower roller 241 travelling in the cam channel 168. Since the relative speed of the various parts of the machine provide for two shearing strokes per revolution of the shaft 38 the cam 168 has duplicate working portions which are symmetrical about the axis, as shown in FIG. 3, although one-to-one correspondence or more than two-to-one correspondence is contemplated.

Reciprocation of the heads at the cutting-off station is accomplished by means of a barrel cam 251 secured for longitudinal adjustment on the shaft 34 by means of set screws 252 and a related key. As the heads are repositioned to accommodate various lengths of springs the cam 251 must be shifted axially accordingly since its throw is fixed by the offset of the channel 254 thereof. A follower roller 255 is carried on a stud 256 mounted in a bracket 257 fastened to a spider 258. At the extremities of the spokes of the spider 258 (FIGS. 2 and 3) are secured individual hollow leader pins 261 providing fixed spacing between the spider and the inner head section 206. Individual bolts 262 have their heads received in a circular T-slot 263 and are provided with nuts 265 whereby to fasten the spider and head as a unit for reciprocation by the cam 251. By means of the bolts 262 the cutting off heads may be rotated relative to the spider 258 whereby the blank may be trimmed at a precise place in a turn thereof. In this way loops having a selected gap may be formed at each end of the spring and, moreover, these gaps may differ from each other. A plurality of springs 266, one over each leader pin 261 accommodate backlash. From the foregoing it will have become clear that the necessary reciprocation of the cutting-off heads to and away from the blank is the result of rotation of the cam 251; meanwhile the cutting-off tool 235 is given its reciprocating action through the cam 167.

Desirably the inner head section 206 is sealed on its periphery by an O-ring 271 received in a shroud 272 affixed to the standard 151 to seal against entry of foreign matter as the head is reciprocated.

Figures 7, 8, 14:
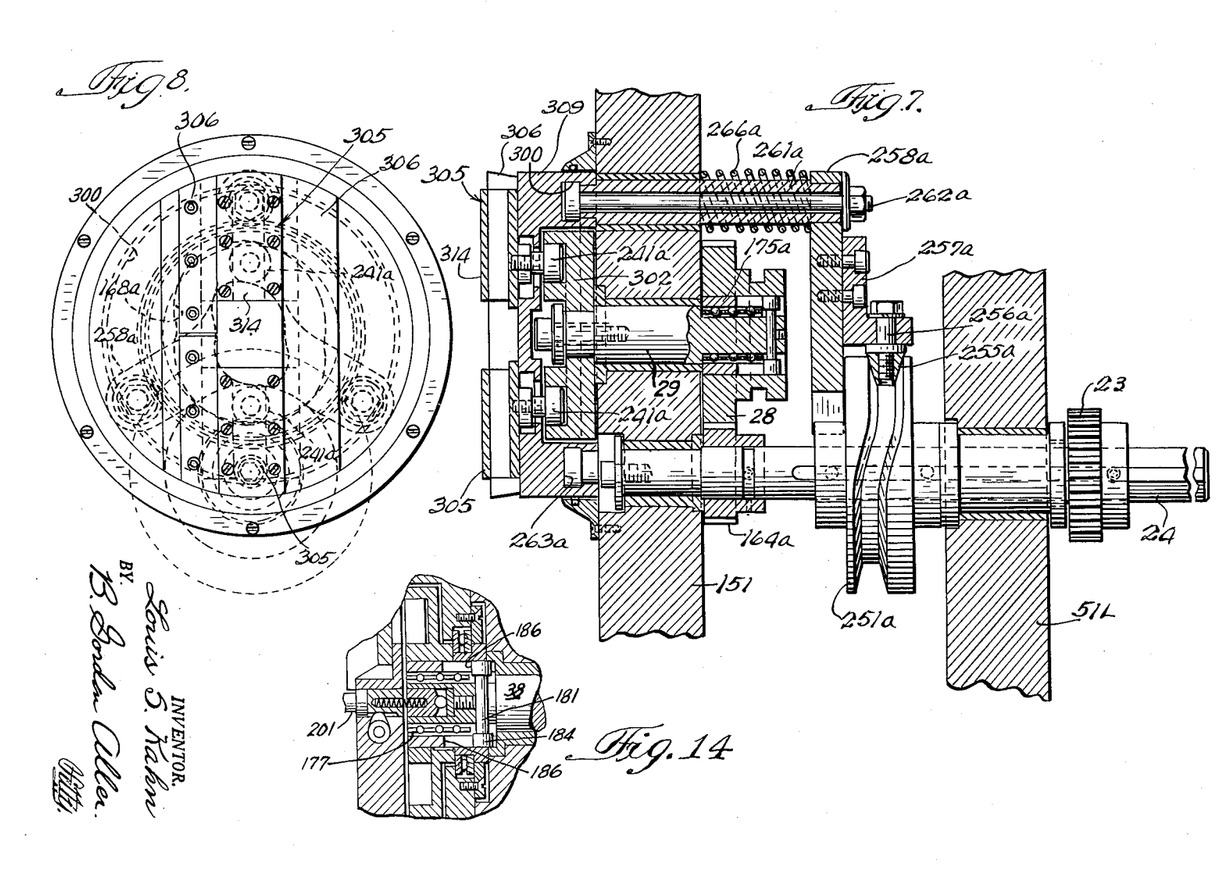
FIG. 7 is a longitudinal cross-section through one of the loop-forming stations, its opposite counterpart being substantially symmetrical therewith.
FIG. 8 is an end elevational view of the loop-forming station shown in FIG. 7.
FIG. 14 is an enlarged showing of a preferred form of drive for the channel cam included in FIG. 2, and which is illustrated further in FIG. 6.

Following stripping of the blanks from the mandrels 201 the shaft 54 is indexed two spaces of the Geneva movement to step the carrier 61 whereby to present the blank to the loop-forming station F. It will be apparent that the number of steps of the Geneva movement is not inventively material but is dictated largely by the geometry of the parts and the speed at which the machine is designed to operate. There are two loop forming heads opposite each other, only one of which is shown in FIGS. 7 and 8. It will be understood that these are coaxial and symmetrical, receiving driving power in common by individual gear trains at each end of the machine.

Since many of the parts of the loop-forming heads are identical with similarly functioning parts of the cutting-off heads the same reference numerals with a suffix letter will be employed wherever practicable.

It will have become apparent that the arrangement of the cut-off heads with respect to the blank work piece is such that symmetry obtains about a vertical mid-plane through the carrier 61. Accordingly two symmetrical heads such as the head shown in detail in FIGS. 7 and 8 are provided for forming the end loops simultaneously. However, these loops need not be identical as the tools for forming the same and their operating mechanism are arranged for independent stroke, angular orientaiton and type and radial position of the respective loops. For example, while the set of tools shown in FIG. 8 is arranged for a vertical stroke, its opposite counterpart could have a stroke axis rotated 90° or at some other angle therefrom. As was done in connection with the cut-off heads only one of the loop-forming heads will be described.

The shaft 29 is rotatably carried on a respective one of the standards 151 and has the channel cam 302 secured thereto. Gear 28 is keyed to a sleeve 175a corresponding to the sleeve 175 of FIG. 2 and is cooperative with a bearing arrangement the same as that shown in FIGS. 2, 6 and 14 whereby the gear 164a on the shaft 24 will rotate the cam 302.

A pair of tool holders 305 are supported for reciprocation radially of the shaft 29 in guideways 306 carried on the disc 309 located non-rotatably, but adjustably, adjacent the standard 151. A spider 258a carries a plurality of posts 261a which are received at one end in the disc 309, and this latter and the spider 258a are secured for joint lateral reciprocation by bolts 262a having their heads engaging an annular T-groove 300 in the disc 309. A plurality of compression springs 266a accommodate backlash. A barrel cam 251a and follower 255a carried on the stud 256a continuously reciprocates the disc 309, upon rotation of the shaft 24, to advance and retract the loop forming tools axially toward and away from the blank presented therebetween by the carrier 61. By means of the bolts 262a the loop-forming heads may be adjusted angularly and independently whereby the plane of each loop may be differently oriented.

Each tool holder 305 has a rotatable cam follower 241a mounted thereon cooperative with the channel 168a of the cam 302 for reciprocation radially to and away from the ends of the spring whereby the loops are formed.

A typical set of tools, absent the tool holders, is illustrated in FIGS. 12 and 13. One tool, 315, comprises a shank 316 to receive a clamping plate or equivalent means 314 (FIG. 7). A backing block 317 having a semi-cylindrical recess 318 is adjustably secured by a screw 319 to the shank 316. An elongated hole 321 permits exact location of the block 317 with respect to the spring blank 300. Obviously the recess 318 will take various diameters congruently with the blank 300 in order that the latter will be suitably restrained pending the loop-forming operation. It will also be apparent that a V-shaped notch may replace the recess 318 to accommodate a variety of diameters of blanks.

A companion tool 322 carries a blade 324 also adjustably secured to its shank 325. This blade has an acutely-angled working edge 327 designed to enter between two adjacent turns of the blank. Thus, after the discs 309 of each loop-forming head have been reciprocated outwardly a block 317 will be positioned opposite each end of the spring. Meanwhile the respective cams 168a have actuated their respective tools 315 and 322 whereby the blocks 317 are positioned as shown in abutment with the respective ends of the blank 300 and the respective blades 324 are brought against the blank. By virtue of the sharp edge of the blade the end turn or turns or a portion of a turn is deformed to the broken line position shown.

To form the end loop following preliminary divergence thereof from the unbent coils, each shank 316 and 325 is provided with an inclined face or anvil 331 and 332 respectively, between which the end loop is seized and bent slightly beyond its final location. Actually the relationship of the blade 324 to the work is such as to overtravel the outwardly bent portion of the blank since, following retraction of the blade 327 and anvils 331 and 332 the resiliency of the spring wire will tend to restore the bent portion toward its original position. Accordingly the faces 331 and 332 are inclined at some necessary angle so that, when the tools are retracted, the end loop or loops will return to the final, specified position, either on the axis of the spring or offset therefrom, as required.

It will be understood that many different forms and positions of end loops may be produced and that these simply require appropriate variations in the tools. Also, for clarity of illustration and exposition the relative positions of the spring blank 300, the block 317 and the blade 324 are not exactly shown, since it will be clear that the blade 324 may be entering between the coils of the spring almost simultaneously with presentation of the block 317 into spring-abutting position.

Following completion of the loop-forming operation the Geneva movement again indexes twice, i.e. two spaces, to rotate the work carrier 61 (FIG. 10) to a position where the completed spring is opposite a delivery chute or equivalent receptacle D. During the indexing operation the pertinent cam follower roller 68 is actuated by the fixed cam 65 to open the vise 101 whereupon the finished spring will drop into the chute.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. In a machine for concurrently trimming both ends of rough-cut blanks of spring stock to a predetermined exact length and for forming end loops thereon which includes a loop forming station, a rotary carrier wheel having means for clampingly receiving the blanks singly and means for advancing the carrier wheel intermittently to present the blanks singly and successively to the loop-forming station, following trimming thereof, the improvement which comprises: trimming means in advance of the loop-forming station in the direction of rotation of the carrier wheel, said trimming means comprising two opposed heads, one opposite each face of the carrier wheel, each head having a mandrel to intromit respective ends of the blank upon advance of the heads to rigidify the blank pending trimming and including a shearing surface, means for advancing and retracting the heads relative to the blank in timed relation with said wheel for intromission of the mandrels relatively to the blank, a reciprocable shearing tool cooperative with each said shearing surface to trim the ends of the blank to the predetermined length, means mounting each said shearing tool on its respective head for adjustable angular positioning relative to the axis of the blank held in trimming position, and means for reciprocating the shearing members.

2. The combination set forth in claim 1, wherein said means for clampingly receiving the blanks singly comprises a plurality of vises carried on the periphery of the wheel, each vise including a fixed jaw and a slidable jaw movable relative to the fixed jaw, said jaws receiving and holding the blank during the operations thereon, a fixed cam, cam follower means individual to each vise carried on said wheel and operatively connected to said slidable jaw for opening and closing said jaws sequentially as the wheel is stepped intermittently, said jaws being provided with respective substantially semi-circular recesses for joint engagement of the blank, at least one jaw of each vise carrying a male member and the companion jaw having an aperture slidingly receiving said male member upon opening and closing of the jaws, said male member being positioned adjacent the boundary of the recesses regarded jointly to provide a momentary rest for the blank upon delivery of the same within the confines of the opened jaws to assure suitable positioning of the blank between said recesses as the jaws close.

3. The combination in accordance with claim 2 further characterized by resilient means associated with each vise providing, when the vise is in closed position, a holding force on the blank substantially equal to the transverse resistance of the blank to crushing.

4. A machine for trimming rough-cut blanks of spring stock to a predetermined exact length comprising: a rotary carrier wheel having means for clampingly receiving the blanks singly from a source of supply thereof, trimming means adapted to operate on both ends of the blank concurrently, means for advancing the carrier wheel intermittently to present the blanks singly and successively to said trimming means, said trimming means comprising two opposed heads, means for reciprocating said heads in unison in a direction axially of the blank in timed relation with the wheel, one head opposite each face of said carrier wheel, each head carrying a mandrel adapted, upon advance of the heads toward the blank, to intromit respective ends of the blank to rigidify the same pending trimming and including a shearing surface, a reciprocable shearing tool for each head cooperative with a respective shearing surface to trim the ends of the blank to said predetermined length, means mounting each said shearing tool on its respective head for adjustable angular positioning relative to the axis of the blank held in trimming position, and respective means for reciprocating the shearing tool relative to said shearing surface to trim both ends of the blank concurrently.

5. The combination in accordance with claim 4 further characterized by stripping means individual to each mandrel having a fixed axial position relative to the mandrel and operatively associated therewith to dislodge the scrap therefrom upon retraction of the mandrel.

6. The combination in accordance with claim 5 wherein said stripping means comprises a member mounted for axial movement relative to the mandrel adapted to abut the scrap remaining on the mandrel to dislodge the same therefrom.

7. In a machine for concurrently trimming both ends of rough-cut blanks of spring stock to a predetermined exact length and for forming end loops thereon which includes a rotary carrier wheel having means for clampingly receiving the blanks singly from a source of supply, and means for advancing the carrier wheel intermittently to present the blanks singly and successively to a loop-forming station following trimming thereof, the improvement which comprises: trimming means in advance of the loop-forming station comprising two opposed heads, one positioned at each side of the carrier wheel, means to advance and retract the heads toward and away from the blank axially thereof, each head comprising a mandrel adapted, upon advance of the heads, to intromit respective ends of the blank to rigidify the same and having a shearing surface, a reciprocable shearing blade on each head cooperative with a respective shearing surface to trim both ends of the blank to length concurrently, means mounting each said shearing blade on its respective head for adjustable angular positioning relative to the axis of the blank held in trimming position, and means carried on each said head for reciprocating the blade individual thereto.

8. A machine for receiving rough-cut blanks of spring material, trimming the same to blanks of a predetermined exact length and forming loops at the ends thereof comprising: a framework, a delivery station, a trimming station and a loop-forming station, an intermittently rotatable carrier for moving the blanks from station to station, sequentially in a circular path, means mounted on said carrier for clampingly holding the blanks during the operations thereon with the longitudinal axis of the blank parallel to the axis of rotation of the carrier, said holding means comprising a plurality of vises mounted on the periphery of the carrier, cam means operatively associated with the vises and framework for opening and closing said vises in a sequential manner, trimming means at the trimming station including a pair of oppositely disposed heads carrying members to intromit respective end portions of the blank concurrently to support said portions during a rest period of the carrier, means for advancing and retracting said heads and members relative to the carrier and to the blank axially thereof, concurrently-operative means individual to each end of the blank to shear the same to said exact length, and means mounting said last named means on the respective heads for universal adjustable angular positioning relative to the axis of the blank, and loop-forming means at the loop-forming station including a pair of oppositely disposed heads, means for advancing and retracting said heads relative to the carrier and to the trimmed blank, tools operative on both ends of the blank concurrently during a subsequent rest period of the carrier to form the loops, means mounting said tools on the respective heads for universal adjustable angular positioning relative to the axis of the trimmed blank, and means for presenting the tools to the blank and for retracting the same.

9. A machine for concurrently trimming both ends of rough-cut blanks of spring stock to a predetermined exact length comprising: carrier means for clampingly receiving the blank over an intermediate portion thereof, means for moving the carrier means to present both ends of the blank to duplicate shearing means, each said shearing means including a movable shearing blade and fixed shearing and blank-supporting means for cutting off the respective end of the blank to said exact length, each said fixed shearing and blank-supporting means comprising a cylindrical mandrel to intromit a respective end of the rough-cut blank including a shearing face constituted as one face of a quadrantal cut-out therein, separate means for supporting each shearing means including means for actuating the movable blade perpendicularly to the axis of the blank, and means operatively associated with each said supporting means to adjust angularly the respective supporting means independently about the axis of the blank to dispose the plane of shear in any of an infinite plurality of angles with respect to the circumference of the blank, whereby the resultant ends of the trimmed blank may be relatively angularly disposed about the circumference thereof.

References Cited in the file of this patent

UNITED STATES PATENTS

| | | | |
|---|---|---|---|
| 906,418 | Harter | Dec. 8, | 1908 |
| 1,065,336 | Bigelow | June 24, | 1913 |
| 1,083,223 | Sleeper | Dec. 30, | 1913 |
| 1,114,846 | Barrett et al. | Oct. 27, | 1914 |
| 1,451,519 | Wilson | Apr. 10, | 1923 |
| 1,491,186 | Bartlett | Apr. 22, | 1924 |
| 1,873,626 | Nigro | Aug. 23, | 1932 |
| 2,371,330 | Irstad | Mar. 13, | 1945 |
| 2,604,202 | Wunderlich | July 22, | 1952 |
| 3,001,556 | Eans et al. | Sept. 26, | 1961 |